(12) United States Patent
Bennett

(10) Patent No.: US 6,318,809 B1
(45) Date of Patent: Nov. 20, 2001

(54) BRAKE COVER AND METHOD FOR USING SAME

(75) Inventor: Blake Bennett, Burbank, CA (US)

(73) Assignee: Pacific Rim and Trim International, Inc., Portland, OR (US)

( * ) Notice: Subject to any disclaimer, the term of this patent is extended or adjusted under 35 U.S.C. 154(b) by 0 days.

(21) Appl. No.: 09/431,541

(22) Filed: Oct. 29, 1999

(51) Int. Cl.$^7$ .................................................. B60B 7/00
(52) U.S. Cl. ..................................... 301/37.1; 188/218 A
(58) Field of Search ................................... 301/6.3, 37.1, 301/37.37; 188/218 A, 264 W

(56) References Cited

U.S. PATENT DOCUMENTS

| | | | |
|---|---|---|---|
| 4,484,667 | * 11/1984 | Bottieri, Jr. ....................... | 188/218 A |
| 6,047,796 | * 4/2000 | Fitzgerald ......................... | 188/218 A |
| 6,089,671 | * 7/2000 | Iacovelli et al. .................... | 301/37.1 |

FOREIGN PATENT DOCUMENTS

| | | | |
|---|---|---|---|
| 204433 | * 12/1986 | (EP) ................................. | 188/218 A |
| 81/03530 | * 12/1981 | (WO) ............................... | 188/218 A |

OTHER PUBLICATIONS

Kleen Wheels Advertismen, Dic. 1984, No Page No., Dec. 1984.*
JC Whitney Catalog, p. 56, Jan. 1996.*
Auto Accessory. Com; Web Page/Sales Info Kleen Wheels Dust Shields, Jul. 26, 2000.*

* cited by examiner

Primary Examiner—Russell D. Stormer
(74) Attorney, Agent, or Firm—Davis Wright Tremaine LLP

(57) ABSTRACT

A brake cover and a process for using the brake cover are disclosed. The brake cover comprises a circular plate having a front surface, a back surface, a perimeter, a centrally located axle hole, and a plurality of lug holes surrounding the axle hole, and a sidewall integrally formed along the perimeter of the circular plate and projecting from the circular plate at a selected angle relative to a plane defined by the circular plate. The process comprises mounting the brake cover on a hub and an axle of the vehicle, the brake cover being designed to cover the brake components, mounting a wheel on the hub and axle of the vehicle, such that the brake cover is sandwiched between the wheel and the hub, and securing the wheel onto the hub.

21 Claims, 5 Drawing Sheets

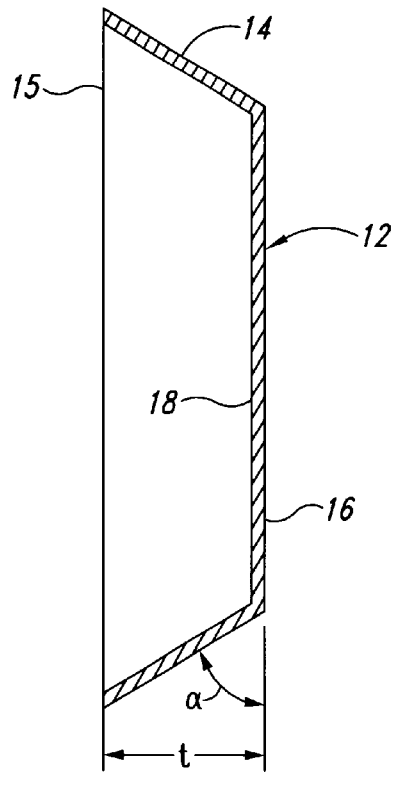 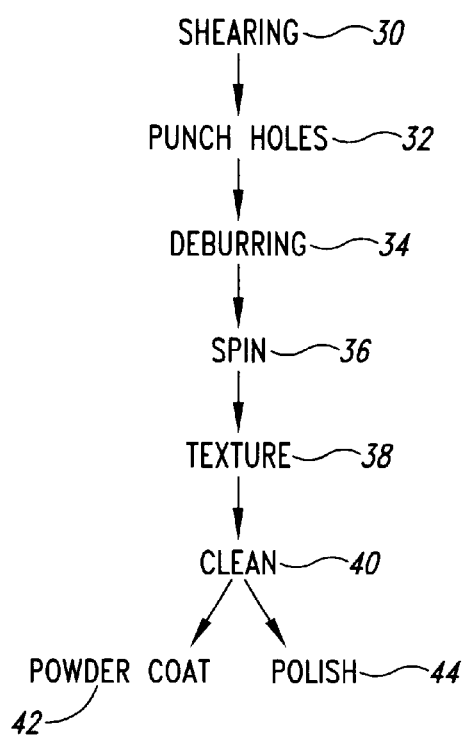
Fig. 3
Fig. 4

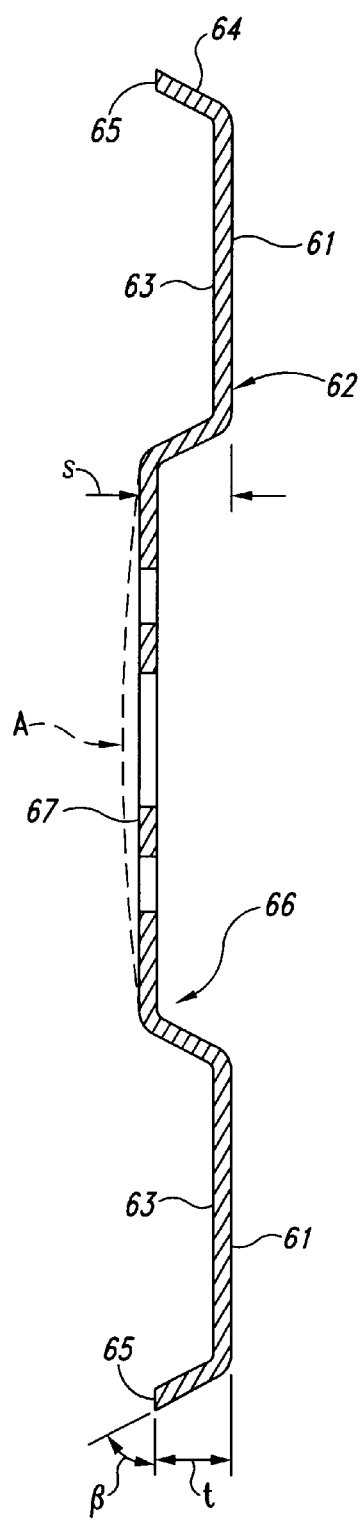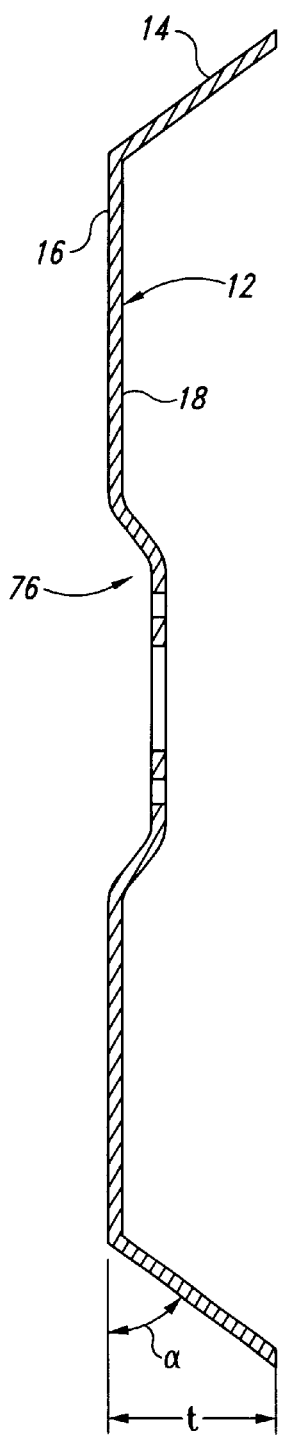
Fig. 9                     Fig. 10

BRAKE COVER AND METHOD FOR USING SAME

FIELD OF THE INVENTION

This invention relates to brake covers adapted for use with automobile wheels, and in particular to brake covers which improve appearance and reduce the accumulation of harmful brake dust on alloy wheels.

BACKGROUND

Automobile wheels come in two basic kinds: steel wheels and alloy wheels. Steel wheels are standard equipment for cars, because they are inexpensive. Unfortunately, steel wheel are utilitarian in appearance and use, and are often covered with hub caps to disguise their utilitarian appearance. Alloy wheels are usually not offered as standard equipment because they are expensive, so if car owners want to improve the appearance of their cars, they must buy alloy wheels from the car dealer or from after-market sellers. In addition to their functional use as wheels, alloy wheels dramatically improve the vehicle's appearance.

Despite their improvement of a vehicle's appearance, alloy wheels suffer from a couple of problems. First, alloy wheels typically have large open vents. The open vent designs allow for more intricate wheel styles, but they also allow unsightly brake mechanisms to be seen through the alloy wheel, including the brake drums, brake discs and overall braking mechanisms. Depending upon the vehicle, some use brake drums and others use disc brakes. Through daily use, braking mechanisms often have rust on their surfaces. This rust does not impair the vehicles ability to reduce speed, however, the rusty brake drums and discs are not attractive when seen through the open vents of an alloy wheel. Since consumers purchase alloy wheels mainly for their cosmetic looks, visibility of the unsightly rusty brake drums and discs defeats the purpose of the alloy wheels.

Second, braking mechanisms such as disc brakes create significant amounts of brake dust. Brake dust is corrosive and can damage the finish of an alloy wheel, which is both unsightly and damaging to alloy wheels if not washed away frequently. Although brake dust will cover both steel and alloy wheels, it is more of a problem with alloy wheels. Gradually over many years, the alloy wheel finish may become pitted or dull from the brake dust's corrosive nature. Since alloy wheels are expensive relative to steel wheels, consumers do not want brake dust damaging their alloy wheels. Additionally, the brake dust makes the alloy wheels look dirty. Through the course of daily driving, a vehicle and its wheels will become dirty from the dirt and grime found on roads. However, the brake dust significantly exacerbates the appearance of dirt on the alloy wheel.

SUMMARY OF THE INVENTION

A brake cover and a process for using the brake cover are disclosed. The brake cover comprises a circular plate having a front surface, a back surface, a perimeter, a centrally located axle hole, and a plurality of lug holes surrounding the axle hole, and a sidewall integrally formed along the perimeter of the circular plate and projecting from the circular plate at a selected angle relative to a plane defined by the circular plate. The process comprises mounting the brake cover on a hub and an axle of the vehicle, the brake cover being designed to cover the brake components, mounting a wheel on the hub and axle of the vehicle, such that the brake cover is sandwiched between the wheel and the hub, and securing the wheel onto the hub.

BRIEF DESCRIPTION OF THE DRAWINGS

FIG. 3 is a side view of the embodiment shown in FIG. 1.

FIG. 4 is a flow chart of the process used to manufacture the brake cover shown in FIG. 1.

FIG. 9 is a sectional view of the of the embodiment shown in FIG. 7.

FIG. 10 is a cross-sectional view of a third embodiment of the present invention.

DETAILED DESCRIPTION OF THE INVENTION

Described below are three embodiments of the present invention. The embodiments illustrate ways in which the present invention can be implemented. In the description that follows, like numerals represent like elements in all figures. For example, where the numeral 10 is used to refer to a particular element in one figure, the numeral 10 appearing in any other figure refers to the same element.

First Embodiment

Figure 1:
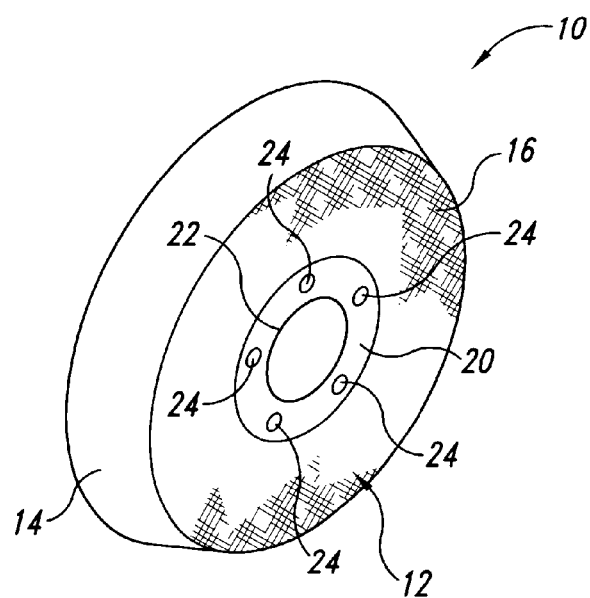
FIG. 1 is a perspective view of a first embodiment of the inventive brake cover.

FIG. 1 shows a first embodiment of the present brake cover suitable for use with drum brakes, also referred to as a "brake drum cover." The brake cover 10 is generally pan-shaped and comprises a substantially flat, circular plate 12 having a sidewall 14 integrally connected to, and extending completely around, the perimeter of the plate. The entire brake cover 10 is a single piece of metal. The circular plate 12 has front surface 16 and a back surface 18 (see FIG. 3). An axle hole 22 is positioned in the center of the plate 12, and a plurality of lug holes 24 are positioned around the axle hole. The cover 10 is preferably made from T-5054 grade aluminum. Other metals may be used as well, but aluminum's heat transfer characteristics make it ideally suited for this application.

Figure 2:
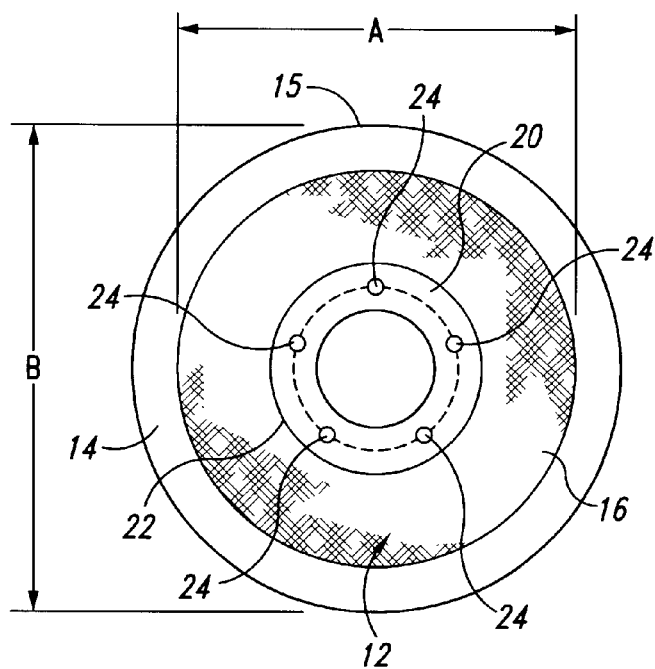
FIG. 2 is a front view of the embodiment shown in FIG. 1.

FIG. 2 illustrates the size and position of the axle hole and lug holes on the front surface of the brake cover. The diameter of the cover 10 along the rim of the sidewall 14 varies between 11 and 13¾ inches, and the diameter of the plate 12 varies between 9⅝ and 11½ inches, although either of these dimensions can be altered to suit the application. The axle hole 22 is centered on the plate 12, and usually has a diameter between 2¾ and 3⁷⁄₁₆ inches, with a preferred diameter of 3½ inches, although its exact diameter will depend on the particular vehicle on which the cover is used. Preferably, the axle hole 22 is slightly oversized to compensate for a variety of vehicle axle sizes.

The pattern of the lug holes 24, and their respective sizes, are also determined by the vehicle on which the brake cover 10 is used. Since the brake cover is secured to the vehicle's axle and hub by the lugs, the pattern of the lug holes 24 must correspond to the pattern of the lugs. Vehicles may use 4, 5, 6, 7 or 8 lugs to secure their wheels to the axle. The lug holes 24 are positioned along a circle having a diameter matching the diameter of the vehicle lug pattern. Typical bolt pattern diameters are between 4.5 and 8 inches, as well as between 80 mm and 135 mm. Again, these bolt pattern diameters may vary according the bolt pattern of new vehicles.

FIG. 3 is a side view showing the sidewall attached around the perimeter of the plate 12 and projecting from a plane defined by plate. The sidewall 14 is integrally connected to the perimeter of the plate portion, and projects toward the back surface of the plate at a selected angle α relative to a plane defined by the plate 12. The angle α is typically between 82 and 85 degrees, but may range between 60 and 85 degrees. The distance t between the plate 12 and the rim 15 of the sidewall is preferably about 3⅞ inches. As further discussed below, the sidewall 14 is formed by bending the perimeter of a round blank in a direction normal to the back surface 18 of the plate.

FIG. 4 illustrates the steps in the process for making the cover 10. At step 30, aluminum sheets ⅟₁₆ inches thick are sheared into circular blanks having a diameter between 14¾ and 21¼ inches, depending on the application. At step 32, the axle hole 22 and lug holes 24 are punched into the blanks using a die with cutting keys matching various vehicle bolt patterns. A five-bolt pattern is illustrated in FIGS. 1 and 2, although bolt patterns may have 4, 5, 6, 7 or 8 holes. The cutting keys typically have diameters between 12 mm and ⁹⁄₁₆ inch, but as new vehicles are manufactured, the number of cutting keys and the cutting key diameters may be adjusted to reflect the bolt patterns and sizes of new vehicles. Once all the holes are punched in the plate at step 32, they are de-burred at step 34 to eliminate any sharp edges that may cut someone handling the product. Following de-burring, the blank is shaped into a brake cover at step 36 by a process known as spinning.

Figure 5:
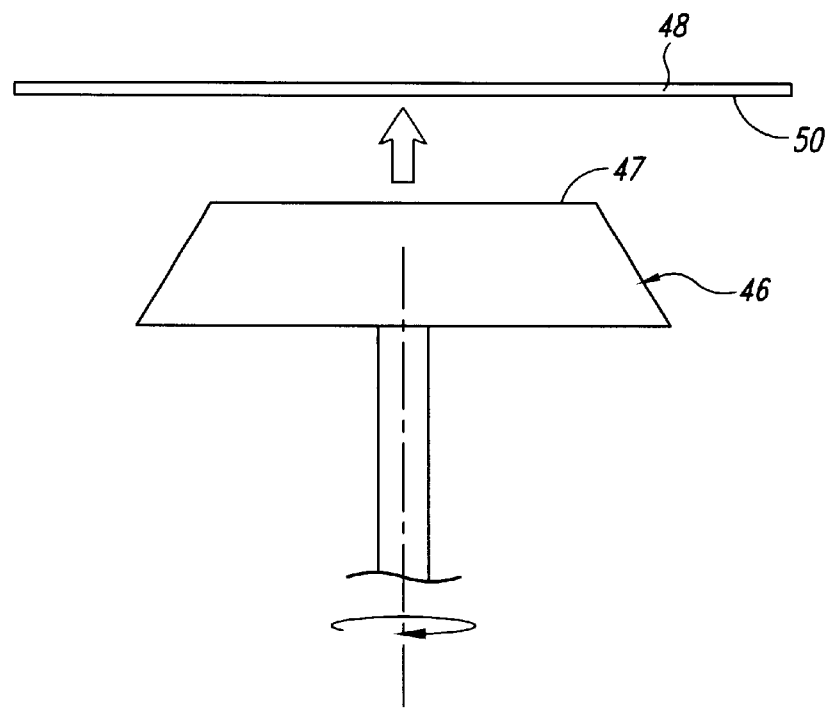
FIG. 5 illustrates the spinning step in the manufacturing of the brake cover of FIG. 1.
Figure 6:
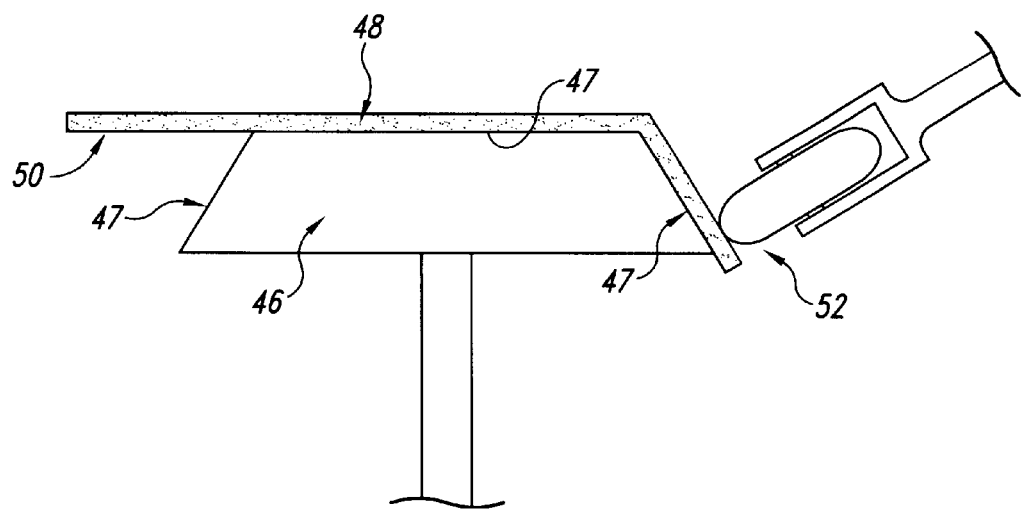
FIG. 6 illustrates the spinning step in the manufacturing of the brake cover of FIG. 1.

FIGS. 5 and 6 together illustrate the spinning process of step 36. In FIG. 5, a steel chuck 46 is created in the shape and size of the brake cover and the top surface 47 of the chuck is brought into contact with the back surface 50 of the blank 48. In FIG. 6, the blank and chuck are loaded onto a spinning machine whereby the blank is bent to conform to the shape of the chuck by a roller 52. The roller 52 rolls around the sloped surface 47 of the chuck, bending the perimeter of the blank into contact with the sloped surface 47. Different sized chucks are needed for various brake drum or disc brake applications.

During spinning, a texture may optionally be applied to the front surface of the cover 10 at step 38 by manually pressing a scoring pad into the outside surface and applying approximately 10–13 pounds of pressure. The scoring starts from the center and the pad in drawn across the surface to the outside edge. The aluminum is soft and easily accepts the texture, which will be a circular pattern with a pleasing aesthetic appearance. Once the cover is shaped and textured, it is cleaned at step 40 to remove any oil, dirt and metal shavings left behind during manufacture. Any cleaning method can be used, as long as the cover is free of oil, dirt and metal shavings upon completion so that the finish can be applied.

Once the cover is cleaned, the final step is to apply the finish, either by powder coating at step 42 or by polishing at step 44. The powder coating may be colored or clear. If colored powder coats including, but not limited to, black, red, blue and white are used, the optional texturing in step 38 is not needed because the colored powder coat covers the texture anyway. If a clear powder coat is used, the texture in step 38 will show through the clear powder coat. The polished finish of step 44 may be performed by any metal polishing process capable of polishing the metal to a high, mirror-like finish.

In operation of the brake cover 10, a vehicle's alloy wheel is removed by disengaging the lug nuts and lifting the wheel off of the wheel hub at the end of the axle. The proper sized brake drum cover or disc shield is positioned on the hub with its back surface toward the braking mechanism, such that the axle projects through the axle hole 22 and the lugs project through the lug holes 24. The front surface 16 of the cover faces outward. The alloy wheel is then positioned on the axle such that the cover is sandwiched between the brake mechanism. The lug nuts are then put on the lugs and tightened to keep the wheel on the vehicle.

Second Embodiment

Figure 7:
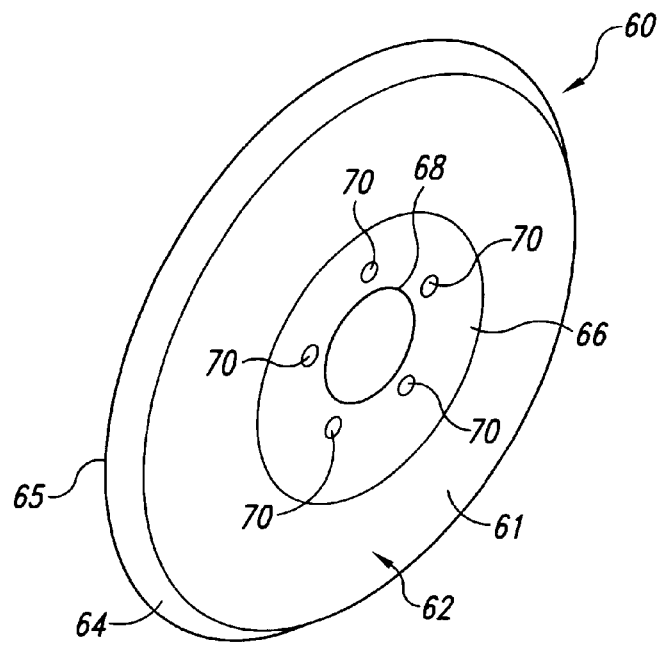
FIG. 7 is a perspective view of a second embodiment of the inventive brake cover.

FIG. 7 illustrates a second embodiment of the brake cover 60 suitable for use with disc brakes. These are also known as "disc shields." The brake cover 60 is flatter than the brake cover 10, and comprises a substantially flat, circular plate 62 having a shallow sidewall 64 integrally connected to, and extending completely around, the perimeter of the plate. A depression 66 is centered on the plate. The circular plate 62 has a front surface 61 and a back surface 63 (see FIG. 9). An axle hole 68 and a plurality of lug holes 70 are offset from the center of the plate. The cover 60 is a single piece of metal, preferably T-5054 grade aluminum. Other metals may be used as well, but aluminum's heat transfer characteristics make it ideally suited for this application.

Figure 8:
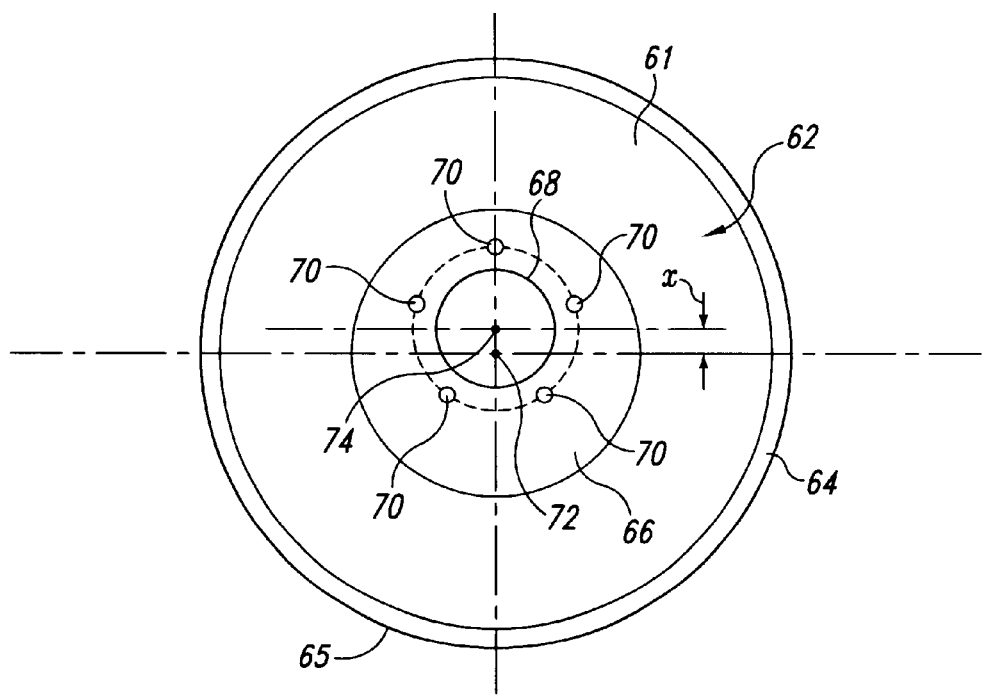
FIG. 8 is a front view of the inventive brake cover of FIG. 7.

FIG. 8 illustrates the size and position of the depression, axle hole and lug holes on the front surface of the brake cover. The cover 60 preferably has an overall diameter of about 13¹¹⁄₁₆ inches, and the depression preferably has a diameter of about 8³⁄₁₆ inches, although both these dimensions can be varied to fit the application. The size of the axle hole and lug holes is similar to that described above in connection with the brake cover 10. The hole center 74 represents the center of the axle hole 68 as well as the center of a circle drawn through the centers of the lug holes 70 (i.e. the centroid of the lug holes). This hole center 74 is offset from the true center 72 of the cover 60 by a distance x. The offset distance x, typically about ⅟₁₆ of an inch, causes the cover 60 to rotate eccentrically when attached to the hub, thus creating a slight vortex effect which helps blow brake dust away from the alloy wheels.

FIG. 9 is a side view showing the sidewall attached around the perimeter of the plate 62 and the depression 66 at the center of the plate. The sidewall 14 is integrally connected to the perimeter of the plate portion, and projects toward the back surface of the plate at a selected angle β relative to a plane defined by the plate 12; the angle β is typically between 82 and 85 degrees, but may range between 60 and 85 degrees. The distance t between the plate 62 and the rim 15 of the sidewall is preferably about ⅜ of an inch, while the distance s between the front surface 61 and the bottom 67 of the depression is about ⁷⁄₁₆ inch. When the cover 60 is installed, this difference between t and s results in a small gap between the rim 65 of the cover and the brake disc. As with the cover 10, the sidewall 64 of the cover 60 is formed by bending the perimeter of a round blank in a direction normal to the back surface 63 of the plate.

The depression 66 is necessary so that the portions of the plate outside the depression will not contact the disc brakes when the cover 60 is installed. The depression 66 preferably has a diameter of about 8³⁄₁₆ inches, and a depth of about ⁷⁄₁₆ inches. When not installed, the bottom 67 of the depression is cambered, preferably with a camber of about ⅟₃₂ of an inch. The dotted line A illustrates the cambered bottom. When the cover is installed, most of the camber disappears, although a slight amount of bending is caused in the cover 60.

The brake cover 60 is manufactured using the process of FIG. 4, with the addition of a step to press the depression 66 into the plate and except for offsetting the axle hole and lug holes from the center of the plate. The chuck used to spin the brake cover 60 has a different top surface 47 (FIG. 6) to accommodate the depression in the cover. The brake cover 60 is used in exactly the same way as the brake cover 10.

Third Embodiment

FIG. 10 illustrates a third embodiment of the brake cover which is a hybrid of the covers 10 and 60. The third embodiment has the overall shape and size of the cover 10 (FIG. 1), except that the flat plate 12 takes on the depression 76 similar to the depression 66 found in the flat plate 62 of the cover 60 (FIG. 8).

The present brake covers 10 and 60, when made and used as described, have some important advantages. First, the brake cover improves the appearance of alloy wheels. The cover is placed between the brake drums/disc brakes and the alloy wheels, obscuring the braking mechanism from sight so that the braking mechanism may not be seen through the vents of the alloy wheel. The overall appearance of the alloy wheel is dramatically improved. The powder coated or polished finish on the brake drum covers or disc shields makes a consistent background to showcase the alloy wheel, and the wheel has a finished and more aesthetically pleasing appearance because the braking mechanism is no longer visible.

Second, the brake cover 60 prevents brake dust from getting on the alloy wheels by covering the brakes and blowing the dust inward toward the vehicles. The shape of the covers provides a barrier between the brakes and the alloy wheels, so the brake dust must get through the brake cover/shields to reach the wheels. Additionally, the cover 60 has an offset from center, which creates a slight vortex or pinwheel effect. The pinwheel effect creates an air flow which gently pushes the dust away from the wheels toward the vehicle. As it blows inward rather than outward, the dust falls to the road and does not come to rest on the alloy wheels.

Three embodiments of the present invention have been described. A person skilled in the art, however, will recognize that many other embodiments are possible within the scope of the invention. For this reason, the scope of the invention is not to be determined from the description of the embodiments, but must instead be determined solely from the following claims.

What is claimed is:

1. A brake cover comprising:
    a solid flat plate having a front surface, a back surface, a perimeter, an axle hole, and a plurality of lug holes surrounding the axle hole, wherein the axle hole is offset from the center of the plate; and
    a sidewall integrally formed along the perimeter of the flat plate and projecting from the plate at a selected angle relative to a plane defined by the plate, such that the resulting brake cover is substantially drum-shaped.

2. The brake cover of claim 1 wherein the flat plate has a circular shape.

3. The brake cover of claim 1 wherein the front surface of the flat plate has a depression therein centrally positioned on the plate.

4. The brake cover of claim 1 wherein the plurality of lug holes comprises between 2 and 8 lug holes.

5. The brake cover of claim 1 wherein the axle hole has a diameter between about 2 inches and about 4 inches.

6. The brake cover of claim 1 wherein the front surface of the plate is highly polished.

7. The brake cover of claim 1 wherein the front surface of the plate is powder coated.

8. The brake cover of claim 1 wherein the front surface of the plate is textured.

9. The brake cover of claim 1 wherein the selected angle is between about 60 degrees and about 85 degrees.

10. A brake cover comprising:
    a solid flat plate having a front surface, a back surface, and a circular depression therein, a perimeter, an axle hole, and a plurality of lug holes surrounding the axle hole, wherein the axle hole is offset from the center of the plate; and
    a sidewall integrally formed along the perimeter of the flat plate and projecting from the circular plate at a selected angle relative to a plane defined by the flat plate.

11. The brake cover of claim 10 wherein the flat plate has a circular shape.

12. The brake cover of claim 10 wherein the depression and the sidewall project approximately equal distances in a direction normal to the plane defined by the circular plate.

13. The brake cover of claim 10 wherein the offset is between about 0.001 inches and about ¼ of an inch.

14. The brake cover of claim 10 wherein a centroid of the plurality of lug holes is offset from the true center of the plate.

15. The brake cover of claim 10 wherein the offset is between about 0.001 inches and about ¼ of an inch.

16. The brake cover of claim 10 wherein the circular depression is centrally located on the solid flat plate and projects away from the front surface of the plate, and wherein the circular depression has a bottom cambered away from the front surface of the plate.

17. The brake cover of claim 16 wherein the camber is approximately ¹⁄₃₂ of an inch.

18. The brake cover of claim 10 wherein the selected angle is between about 60 degrees and about 85 degrees.

19. A process for obstructing a view of brake components of a vehicle using a brake cover, comprising:
    mounting the brake cover on a hub and an axle of the vehicle, the brake cover being designed to obstruct the view of the brake components, wherein mounting a brake cover on the hub and the axle comprises mounting the brake cover such that the true center of the brake cover is offset from the true center of the hub and axle;
    mounting a wheel on the hub and axle of the vehicle, such that the brake cover is sandwiched between the wheel and the hub; and
    securing the wheel onto the hub.

20. The process of claim 19 wherein mounting the brake cover on a hub and an axle of the vehicle comprises positioning an axle hole in the brake cover over the axle and positioning a plurality of lug holes on a plurality of lugs projecting from the hub.

21. The process of claim 19 wherein securing the wheel onto the hub comprises bolting the wheel onto a plurality of lugs projecting from the hub.

* * * * *